United States Patent
Fjarlie

[11] 4,256,405
[45] Mar. 17, 1981

[54] SCANNING SPECTROMETER

[75] Inventor: Earl J. Fjarlie, Kingston, Canada

[73] Assignee: Her Majesty the Queen in right of Canada, as represented by the Minister of National Defence, Ontario, Canada

[21] Appl. No.: 944,139

[22] Filed: Sep. 20, 1978

[30] Foreign Application Priority Data

Jan. 13, 1978 [CA] Canada .................................. 294932

[51] Int. Cl.³ ........................... G01B 9/02; G01J 3/28
[52] U.S. Cl. .................................. 356/346; 350/331 R; 350/267; 356/330
[58] Field of Search ............... 356/308, 346, 326, 328, 356/330, 332, 334, 416, 418, 419; 350/267, 331

[56] References Cited

U.S. PATENT DOCUMENTS

| 2,823,577 | 2/1958 | Machler ........................... 356/326 X |
| 3,437,411 | 4/1969 | Rudomanski et al. ............... 356/418 |
| 3,554,649 | 1/1971 | Ridgway ............................. 356/334 |
| 3,961,181 | 6/1976 | Golden ............................... 350/331 |

Primary Examiner—F. L. Evans
Attorney, Agent, or Firm—Cushman, Darby & Cushman

[57] ABSTRACT

The dispersion means of the present scanning spectrometer comprises an interference filter or diffraction means to be positioned at a known angle to the optical axis of the input flux to the spectrometer. The spectrometer is provided with shutter means for passing the light to the filter or diffraction means through sequentially spatially varied locations in the shutter means, and with means for receiving and passing light from sequentially varied locations of the shutter means at varying, measurable angles of incidence to the filter or diffraction means. The shutter means may be a liquid crystal cell.

4 Claims, 1 Drawing Figure

SCANNING SPECTROMETER

BACKGROUND OF THE INVENTION

This invention relates generally to scanning spectrometers and more particularly concerns a spectrometer which works on the principle of varying angles of incidence of light on an interference filter or diffraction means to permit analysis of the spectrum of that light.

Spectrometers work by isolating a certain input flux, dispersing that flux into its constituent wave length parts, and then focusing the resultant "picture" or spectrum onto a recording detector such as a photographic plate or other elctromagnetic radiation detector or sensor. In order to analyze or make measurements on the output spectrum, it is necessary to be able to identify each spectral feature either as a function of time as that feature passes along the recording sensor or as a function of wave length. In standard spectroscopes, such as the Czerney-Turner spectroscope, the dispersion means consists of a difraction grating which is movable in relation to the body of the spectrometer to enable a scan of the spectrum of the light being analyzed.

There are advantages to spectrometers which permit wave length scanning with minimal or no movement of the dispersing element. In such a case, the dispersing element can be more closely controlled since it does not have to move rapidly, and the wave length scan or differentiation, $dI/d\lambda$, can be made independent of time and hence a potential source of signal-to-noise confusion is eliminated (here I is the intensity or irradiance value).

Nevertheless such instruments still have drawbacks. The scans must still be accomplished by mechanical devices which can easily become misaligned and which can be somewhat awkward to handle compared to the rest of the spectrometer. Further, the motion required can occasionally disturb the alignment of the main dispersing element in the instrument, making the output data meaningless.

Accordingly it is an object of the present invention to eliminate or minimize the difficulties presented by such systems by providing a spectroscope which enables a scan without movement of the dispersion element. It is a further object of the invention to provide such spectroscope which may enable the carrying out of a scan electronic means alone and the requirement of no moving parts.

SUMMARY OF THE INVENTION

In accordance with the invention, a spectrometer for analyzing a spectrum of light from a source, having a slit assembly for isolating a certain input flux along an optical axis, dispersion means for dispersing that flux into its constituent wave length parts, and a recording detector for identifying and recording spectral features of the light, is provided wherein the dispersion means comprises an interference filter or diffraction means to be positioned at a known angle to the optical axis of the input flux. The spectrometer is also provided with shutter means for passing the light to the filter through sequentially, spatially varied locations in the shutter means, and with means for receiving and passing light from such sequentially varied locations of the shutter means at varying measurable angles of incidence to the filter. Preferably a cylindrical lens receives and passes the light from the shutter means to the interference filter. The shutter means may be a liquid crystal cell appropriately provided with transparent electrodes deposited on the surfaces of the cell in contact with the liquid to provide the shutter effect. The shutter means might alternatively be a mechanical chopper arrangement analogous to a Nipkow disc, familiar from the first television scanning processes. When a liquid crystal cell is used however it becomes possible to carry out the scan by electronic means alone, with no moving parts.

Accordingly, the spectrometer according to the present invention permits a method of analyzing the wave length of light from a source which comprises the steps of sequentially spatially varying the light from that source along an optical axis, passing the spatially varied light at varying measured angles of incidence to an interference filter positioned at a given angle to that optical axis, and spectrally analyzing the resultant spectrum from the interference filter.

BRIEF DESCRIPTION OF THE DRAWINGS

Other objects and advantages of the invention will become apparent upon reading the following detailed description and upon referring to the drawings in which.

Figure 1:
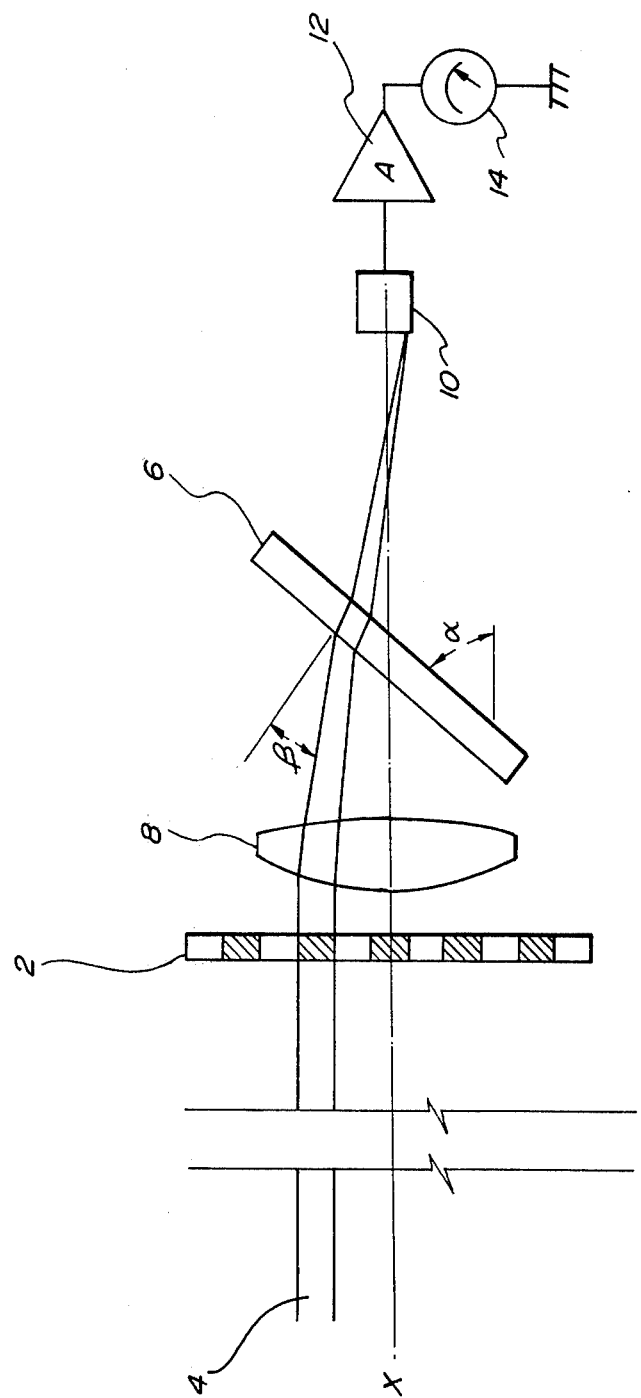
FIG. 1 is a schematic diagram of an example embodiment of a spectroscope according to the present invention.

While the invention will be described in connection with a preferred embodiment and method, it will be understood that it is not intended to limit the invention to that embodiment and method. On the contrary, it is intended to cover all alternatives, modifications and equivalents as may be included within the spirit and scope of the invention as defined by the appended claims.

DETAILED DESCRIPTION OF THE INVENTION

Turning to FIG. 1, there is shown a schematic diagram of a scanning spectrometer having a combined slit assembly and shutter means 2 for isolating a certain input flux 4 travelling along an optical axis X, and a dispersion means 6 comprising an interference filter positioned at angle $\alpha$ to the optical axis of the input flux. Dispersion means 6 may altenatively be, for example, a diffraction grating (either ruled, replica or holographic) or a prism. The interference filter however offers economy of construction. Shutter means 2 sequentially, spatially varies the light passed to interference filter 6 in a manner which will be more completely explained hereinafter. A cylindrical lens 8 receives the sequentially, spatially varied light from shutter means 2 and passes that light, at varying, measurable angles of incidence $\beta$ to the filter 6. A recording detector 10, such as an electromagnetic radiation detector or sensor is provided to receive the resultant spectrum from filter 6. The recorded spectrum is amplified at amplifier 12 and identified at indicator 14.

To more fully appreciate the operation of the illustrated spectroscope according to applicant's invention, it will be understood that an interference filter is an optical device which transmits only a narrow band of wave length, other wave lengths being suppressed by the destructive interference of waves transmitted directly through the filter and those reflected 2x times, where x is an integer (from back and front faces of the filter). The scanning spectrometer of the present invention makes use of the fundamental property of such interference filters that their basic spectral pass band and their center wave length are a function of the angle of incidence of the incoming radiation.

An interference filter has the property that the wavelength passband shifts towards shorter wavelengths as the angle of incidence changes. The equation is:

$$\lambda = \lambda_o \cos(\theta/n)$$

where $\lambda_0$ is the passband centre wavelength, $\theta$ is the angle of incidence, n is the index of refraction of the filter material (most often zinc cryolite) between the substrates, and $\lambda$ is the new centre wavelength. Since $\theta$ varies as the liquid crystal segments switch position electronically, $\lambda$ varies.

By combining the interference filter 6 with a cylindrical lens 8, as shown in FIG. 1, the filter being at the angle $\alpha$ with the optical axis, it is seen that flux from the lens which is focused at the detector 10 strikes the filter 6 at an angle of incidence $\beta$, which angle depends on the spatial position of that flux as it emerges from lens 8.

By choosing $\lambda_o$ for the filter in accordance with the position of an emission or absorption feature of interest in the source being investigated, the spatial scan causes the passband of the filter to shift across the feature. The total energy coming through the instrument is recorded and the nature of the feature can be determined from the record. The user might wish to compare the data with a "standard" or a handbook value. In order to measure a different feature it would be necessary to insert a new interference filter into the instrument and reorient that filter to a new fixed angle, $\alpha$.

The filter passband centre wavelength and the angle of incidence must be chosen to match the feature under investigation. As the scan proceeds, there will be a "smearing" or cross correlation effect between the filter bandwidth and the feature bandwidth. In addition, the filter bandwidth will change with angle of incidence as well. The equation is:

$$\Delta\lambda = \lambda_o \theta^2 / 2n^2$$

where the symbols have the same meaning as above. This further variable smearing factor must be kept in mind when the analysis is made.

The size of the filter needed depends on the geometrical considerations of the instrument: F-number, aperture diameter, field of view, etc. In a model that has been built, the filter has a size of 2 in. × 2 in., a centre wavelength of $\lambda 1.06$ $\mu$m, and a passband of $\beta\lambda 100A$. The Nd YAG laser line at $\lambda 1.06$ is the source under investigation.

Since the wave length of the basic spectral pass band and the central wave length of the interference filter are both functions of $\alpha$ and $\beta$ it will be appreciated that a mechanism is hereby provided whereby spatial information has been traded for spectral information. Likewise, where the dispersion means is a prism or diffraction grating, the instrument, by the technique of the present invention, changes a spatial variation across the field of view to a spectral variation behind the dispersion means.

Using this principle, it is possible to insert a mask or shutter 2 in front of lens 8 which would sequentially open and close, starting, for instance, at the top and proceeding to the bottom, to give the spectral-spatial tradeoff outlined. Such a shutter could be a mechanical chopper arrangement analogous to a Nipknow disc, as previously mentioned, or a liquid crystal cell preferably of nemantic liquid crystals. In the latter case it is possible to carry out the entire operation by electronic means alone with no moving parts.

It will be understood that a liquid crystal cell consists of a liquid crystal sandwiched between two plates of glass (or other transmitting material) with transparent electrodes deposited on the surfaces in contact with the liquid. The molecular chains of the crystal may be oriented for example by striations in the electrodes and glass surfaces, lecithin deposition, angular disposition, etc. When an electric field is applied, the liquid crystal becomes a scattering medium so that light incident on the one side does not pass through the cell. The contrast ratio between the "on" and "off" conditions is established by the crystal material, the electrodes spacing (crystal thickness), the field applied and the wave length of the incident light. The lens immediately behind the liquid crystal serves to inhibit the scattered light from reaching the detector. Thus, contrast at the detection point is improved by the presence of the lens. Apropriate transparent electrodes for the liquid crystal cell might be very thin layers of gold or tin oxide. Indium oxide and very thin aluminum are also acceptable.

It should be noted that in a spectroscope according to the present invention, the extent of the wave length scan is determined by the broadening of the basic spectral pass band of the interference filter 6 as $\beta$ becomes large (i.e. larger than about 30°) and the characteristics of the spectral feature under investigation which are most likely less than 250 nm in extent. There is no broadening or smearing if a diffraction grating or prism were used as the dispersing element.

Nevertheless, the spectroscope according to the present invention permits scanning of a spectrum using fewer or no moving parts and as such is a distinct advantage over previously known spectroscopes. Applications of a spectroscope according to the present invention are in remote sensing and routine data collection of a specific nature, and may include a pollution and other sources of absorption or emission of light waves. Also any application requiring patrol or routine spectroscope monitoring at low resolution would be of interest since there would be little requirement for highly trained operating personnel.

Thus it is apparent that there has been provided in accordance with the invention an apparatus and method of analyzing the wave lengths of light from a source that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly it is intended to embrace all such alternatives, modifications and variations as fall within the spirit and broad scope of the appended claims.

The embodiments of the invention in which an exclusive property or privilege is claimed are defined as follows:

1. In a spectrometer for analyzing a spectrum of light from a source, the spectrometer having a slit assembly for isolating a certain input flux along an optical axis, dispersion means for dispersing that flux into its constituent wave length parts, shutter means for passing the light to the dispersion means through sequentially spatially varied locations in the shutter means, and a recording detector for identifying and recording spectral features of the light, the improvement wherein the spectrometer is provided with an electronic scanner shutter means consisting of a liquid crystal cell, and with cylindrical lens means for receiving and passing light from such sequentially spatially varied locations of the shutter means to the dispersion means at varying measurable angles of incidence and wherein the dispersion means comprises an interference filter positioned at a known angle to the optical axis of the input flux.

2. A spectrometer according to claim 1, wherein the shutter means comprises a liquid crystal cell having a series of transparent electrodes deposited on its surfaces in contact with the liquid crystal, whereby sequential, spatial varying of the light passed to the filter is achieved by electronic means.

3. A spectrometer according to claim 1, wherein the shutter means is incorporated into the slit assembly and wherein the slit assembly and shutter means comprise a liquid crystal cell having a series of transparent electrodes deposited on the surfaces of the cell in contact with the liquid crystal.

4. A method of analyzing the wave length of light from a source, comprising the steps of
   (a) sequentially spatially varying the light from said source along an optical axis by electronically scanning the incident light on a liquid crystal cell shutter means;
   (b) passing said sequentially spatially varied light through cylindrical lens means to a dispersion means in the form of an interference filter positioned at a known angle to said optical axis, at varying measurable angles of incidence, and
   (c) analyzing the resultant spectrum from said dispersion means.

* * * * *